US009853980B2

(12) United States Patent
Radier et al.

(10) Patent No.: US 9,853,980 B2
(45) Date of Patent: Dec. 26, 2017

(54) TECHNIQUE FOR CONFIGURING SECURED ACCESS TO A HOST NETWORK FOR AN INVITED TERMINAL

(71) Applicant: Orange, Paris (FR)

(72) Inventors: Benoit Radier, Perros Guirec (FR); Sebastien Nicaisse, Issy les Moulineaux (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/538,523

(22) Filed: Nov. 11, 2014

(65) Prior Publication Data
US 2015/0195282 A1    Jul. 9, 2015

(30) Foreign Application Priority Data
Nov. 12, 2013   (FR) ...................................... 13 61033

(51) Int. Cl.
*H04L 29/06* (2006.01)
*H04W 12/04* (2009.01)
(Continued)

(52) U.S. Cl.
CPC .............. *H04L 63/10* (2013.01); *H04L 67/22* (2013.01); *H04W 12/04* (2013.01); *H04W 84/12* (2013.01)

(58) Field of Classification Search
CPC ........ H04L 63/10; H04L 67/22; H04W 12/04; H04W 84/12
See application file for complete search history.

(56) References Cited

U.S. PATENT DOCUMENTS

2008/0195741 A1*  8/2008  Wynn .................... G06Q 10/10
                                                              709/229
2012/0110640 A1*  5/2012  Donelson .............. H04L 63/102
                                                              726/3
(Continued)

FOREIGN PATENT DOCUMENTS

EP          2337388 A2      6/2011

OTHER PUBLICATIONS

Perez, Condiguring Network Level Authentication for RDP, Mar. 17, 2012, 16 pages.*
(Continued)

*Primary Examiner* — Oleg Korsak
(74) *Attorney, Agent, or Firm* — David D. Brush; Westman, Champlin & Koehler, P.A.

(57) ABSTRACT

A method is provided for configuring access to a network, to authorize an access to the network for at least one invited terminal associated with an invited user. The method is implemented by a first network access management module associated with a host user. The method includes: receiving, from a terminal associated with the host user, an offer to share the access to the network intended for the invited user, the users being connected via a social network; obtaining, from a second network access management module associated with the invited user, information identifying the invited terminal; obtaining, from the network, configuration information allowing access to the network by the invited terminal, following a sending, to the network, of an access configuration request comprising the identification information; and sending, to the second management module, configuration information intended for the invited terminal allowing it access to the network.

12 Claims, 3 Drawing Sheets

(51) Int. Cl.
*H04L 29/08* (2006.01)
*H04W 84/12* (2009.01)

(56) References Cited

U.S. PATENT DOCUMENTS

2012/0266217 A1* 10/2012 Kaal .................. H04L 63/0407
 726/4
2013/0198383 A1* 8/2013 Tseng .................. H04L 63/102
 709/225

OTHER PUBLICATIONS

French Search Report and Written Opinion dated Aug. 8, 2014 for corresponding French Application No. 1361033, dated Nov. 12, 2013.
"Chapter 3 Wireless Security Settings", Aug. 1, 2006 (Aug. 1, 2006), XP055133887.
English translation of French Written Opinion dated Aug. 8, 2014 for corresponding French Application No. 1361033.1, dated Nov. 12, 2013.

* cited by examiner

TECHNIQUE FOR CONFIGURING SECURED ACCESS TO A HOST NETWORK FOR AN INVITED TERMINAL

CROSS-REFERENCE TO RELATED APPLICATIONS

None

FIELD OF THE DISCLOSURE

The disclosure relates to the field of controlled access to a private wireless communication network, more particularly, a method for remotely configuring a secured access to such a network for an invited terminal.

BACKGROUND OF THE DISCLOSURE

Hereinbelow, a private network denotes a non-public network for which access is open only to certain users. This access is, for example, restricted by configuration information that a user needs to have in order, on the one hand, to identify the network and, on the other hand, to be authorized to access the network. Such information may, for example, be authentication parameters comprising an identifier of the network, such as an "SSID" ("Service Set Identifier") identifier, associated with a network access key (e.g. WEP key, WEP standing for "Wired Equivalent Privacy", WPA key, WPA standing for "Wi-Fi Protected Access").

When a user who has administration rights for a private network wants to offer to share access to this network, called "host network", to another user, one simple solution consists in explicitly communicating to the latter the configuration information allowing that user access. It is then possible for a user who is offered such sharing of an access, or "invited user", to manually configure his or her terminal, hereinafter called "invited terminal".

This solution does, however, present a security risk due in particular to the transmission of sensitive data to the invited user by the user who is offering to share the access to the host network, or "host user". It also entails a step of inputting configuration information by the invited user, a particular source of errors in as much as it generally involves completing fields with alphanumeric character strings that are long and difficult to memorize.

The European patent application published on 22 Jun. 2011 under the reference EP 2337388 A2 describes a method enabling an invited terminal, already configured to access a visitor network via a visitor gateway, to access a host network via a host gateway with the identifier and network access key enabling it to access the visitor network. More specifically, the host gateway memorizes a unique identifier for each invited user entered by a host user who has administration rights on the host network. The host gateway then contacts a user database in order to obtain an address of the visitor gateway. Then, it sends a request to obtain the authentication parameters allowing access for the invited terminal to the visitor gateway. In the case where the latter memorizes a unique identifier of the host user, it returns the requested parameters to the host gateway. The host gateway then creates an access with the authentication parameters of the visitor gateway. The invited user is authenticated with the host gateway via the access created with the authentication parameters of the visitor gateway.

This solution presents certain drawbacks. Notably, it does not make it possible to offer access to a user terminal not previously already configured to access another network. Furthermore, it entails the sending, by the invited user, of his or her authentication parameters to the host user, which can be a significant security failing in the case of a malicious host user, or of a user spoofing the identity of the host user.

SUMMARY

According to a first aspect, the disclosure relates to a method for configuring access to a network, called host network, to allow at least one terminal associated with an invited user, called invited terminal, to access the host network, the method being implemented by a first network access management module associated with the host user, and comprising the following steps:

reception from a terminal associated with the host user, of an offer to share the access to the host network intended for the invited user, the host and invited users being connected via a social network;

obtaining from a second network access management module associated with the invited user, of information identifying the invited terminal;

obtaining from the host network of configuration information allowing access to the host network by the invited terminal, following the sending, to the host network, of an access configuration request comprising the identification information; and sending, to the second management module, of configuration information, intended to be transmitted to the invited terminal to allow it to access the host network.

The configuration method allows a host user to share the access to a host network only with users expressly authorized by the latter to access the network. Since the host user is also connected with the invited user via a social network, there is a pre-existing link of trust between the two users. Such a link notably allows the host user to offer the access to the host network only to reputedly trusted users.

It should also be noted that it is not necessary for the invited user to have a terminal previously configured to access another network to be able to access the host network. In particular, in the case, for example, of a Wi-Fi access to the host network, when the invited user uses a terminal that has a Wi-Fi radio interface, no subscription with a telecommunication operator is required for the access to the host network. Since this method does not involve user data obtained from a telecommunication operator, it is open to any invited terminal associated with the invited user, whether or not the latter is a subscriber to a telecommunication operator.

More specifically, the method makes it possible to supply the configuration information necessary to the configuration of the terminal of an invited user to access the host network. Since such information is exchanged via a first network access management module and a second network access management module respectively associated with the host user and with the invited user, the input and attendant risks of errors are minimized both for the host user and for the invited user. Similarly, the information identifying the invited user is directly obtained from the social network, which, while minimizing the risks of errors as for the configuration information, also facilitates its access. Furthermore, the recourse to a social network makes it possible to offer an access to the host network to invited users who are not only geographically remote from the host user, but also remote from the host network itself. The host user himor herself does not need to be located in proximity to the host network to offer access to it.

Since the information concerning the invited terminal (e.g. MAC address, MAC standing for Media Access Control, IMEI, standing for International Mobile Equipment Identity) are obtained from the second network access management module, there is no need for the information to be input by the host user, which enables a host user to configure a sharing of an access to the host network simply. The input errors are also eliminated. Furthermore, the inclusion of the information identifying the invited terminal that is obtained enables the first management module to perform a reinforced access control. An access to the host network from a user terminal having recovered authentication parameters from an invited terminal authorized to access the host network cannot, for example, be successful if the user terminal is not known to the first management module.

It should moreover be noted that controlled access to a network that relies only on network access keys such as a WEP or WAP key no longer now on its own guarantees a secured access. According to the prior art techniques concerning decryption, these keys can in fact be decrypted in a few seconds. Controlled access that takes into account an identifier of the invited terminal therefore makes it possible to reinforce the security with respect to the access to the host network.

Furthermore, since the access is offered by the host user, only the first management module sends configuration information. This means that there is no sending of sensitive data (e.g. keys for being authenticated on another network) that is requested of the invited user.

According to a particular feature, the access configuration method further comprises, prior to the step of obtaining identification information, a step of obtaining, via the social network, an address of the second management module, this address being used in the obtaining of the identification information from the second management module.

Since the address of the second management module being obtained via the social network, a change in the relationship (e.g. breaking of the link that exists between the host and invited users at the initiative of one or other of the two users) between the host user and the invited user is automatically taken into account for the sharing of the access to the host network. In the case, for example, in which the host and invited users are no longer connected via the social network, the latter is no longer able to supply an address of the second management module to the first management module. The configuration of a sharing of the access to the host network is then either impossible, or updated in order to no longer authorize the access to the host network for an invited user who is no longer connected with the host user when a configuration for this user already existed.

According to a particular feature, the configuration information sent to the second management module comprises authentication parameters for the access to the network.

According to a particular feature, the authentication parameters are specific to the invited terminal, the method further comprising, prior to the step of sending to the host network, a step of generation of the authentication parameters by the first network access management module.

The generation of authentication parameters associated with the invited terminal enables the host user to choose an applicable security level for the invited terminal. This security level varies, for example, as a function of the level of trust that the host user grants to the invited user, or even as a function of characteristics of the invited terminal used by the invited user. If the invited user is reputed to be highly trusted, it is not, for example, necessary to implement a strong authentication likely to slow down the time to attach the invited terminal to the host network. The authentication parameters can also be chosen as a function of their compatibility with the authentication protocols available to the invited terminal.

Furthermore, the creation of authentication parameters associated with the invited terminal makes it possible to offer this terminal a personalized access to the host network. This personalized access consists, for example, in creating an identifier/network access key pair specific to the invited terminal or to the invited user. To this end, a parameterizing making it possible to simultaneously create a number of accesses to the host network from one and the same access point can advantageously be used. This parameterizing may, for example, offer a distinct SSID network identifier for each invited terminal authorized to access the network (this will be, for example, a so-called "multi-SSID" parameterizing). It is then not necessary for the first management module to communicate the authentication parameters used by the host user to access the host network. Similarly, the invited user does not transmit to the host user authentication parameters originating from an access configuration for another network which one of his or her terminals is authorized to access.

An access specific to an invited terminal also offers more flexibility in the configuration of access to the host network. An access offered to the invited user can, for example, be deleted or updated without effecting the access configuration for the host network of the host user or of other invited users.

The access to the host network can also be personalized as a function of the invited terminal, or of a type of invited terminal using different attributes defined by the host user (e.g. connected time offered, bandwidth offered). This differentiation of the accesses for each invited terminal also makes it possible to obtain host network usage statistics broken down by invited terminal in a simple manner.

According to a particular feature, the access configuration method also comprises, prior to the reception step, a step of obtaining, via the social network, a list of invited users, the steps of the method being reiterated for each invited user in the list.

The step of obtaining a list of invited users allows more flexibility with respect to the host network access configuration. The host user can, notably, exploit advantages offered by the social network for constructing or obtaining a list of invited users: notably, easy selection of the invited users and obtaining of the invited users by simple authentication with the social network.

According to a particular feature, the access configuration method further comprises a step of updating of the configuration information allowing access to the host network by the invited terminal.

The advantages stated for the access configuration method according to any one of the features of the first aspect can be directly transposed to the access configuration method according to the second aspect.

According to a second aspect, the subject of the disclosure relates to a method for configuring access to a network, called host network, to allow a terminal associated with an invited user, called invited terminal, to access the host network, the method being implemented by a first network access management module associated with the invited user, and comprising the following steps:

supply of information identifying the invited terminal to a second network access management module associated with the host network, in response to a request for information identifying the invited terminal received from the second module;

reception from a terminal associated with the host user, via a social network, of an offer to share the access to the host network intended for the invited user, the host and invited users being connected via the social network;

reception of a request to access the host network from the invited terminal; and sending, to the invited terminal, of configuration information obtained from the second management module, the configuration information comprising an access configuration enabling the invited terminal to access the host network, obtained by the second management module by means of the information identifying the invited terminal.

According to a particular feature, the identification information is supplied after the reception of a message selecting the invited terminal by the invited user.

The selection of the terminal enables the invited user to choose the terminals for which he or she wants the host user to authorize access. The invited user is also assured that this information will not be recovered by a host user or a third party to whom he or she does not want it communicated. The method makes it possible in particular to avoid a configuration for accessing the host network for terminals for which the probability of accessing the network is very low.

According to a particular feature, the access configuration method further comprises, prior to the step of reception of the access request, a step of obtaining, from the invited terminal, of an agreement from the invited user to the offer to share the access received from the host user.

The obtaining of an agreement to the offer to share the access to the host network enables the first management module not to invoke an access configuration for terminals for which the probability of accessing the host network is very low. These may, for example, be terminals that have radio interfaces for accessing a network but with very little likelihood of being moved and therefore of being located within range of the host network (e.g. television, domestic electrical appliance). A configuration for access to the host network for such terminals is thus avoided. The method also makes it possible not to impose an unwanted access configuration for the host network on an invited user by allowing him or her the possibility to deny the agreement.

According to a third aspect, the disclosure relates to a network access management module arranged to authorize an access to a host network for at least one invited terminal associated with an invited user, the module being associated with a host user, comprising:

a first communication submodule arranged to communicate with a social network, the users being connected via the social network;

a first reception submodule arranged to receive, from a terminal associated with a host user, an offer to share the access to the host network intended for the invited user;

a first sending submodule arranged to send, to a second network access management module associated with the invited user, a request for information identifying the invited terminal, and to send, to the second management module, configuration information intended for the identified invited terminal, the configuration information allowing access to the host network;

a second reception submodule arranged to receive, from a second network access management module associated with the invited user, information identifying the invited terminal;

a second sending submodule arranged to send, to the host network, an access configuration request, the configuration, once done, making it possible to authorize the identified invited terminal to access the host network.

According to a fourth aspect, the disclosure relates to a network access management module arranged to authorize at least one invited terminal associated with an invited user to access a host network, the module being associated with an invited user, comprising:

a first communication submodule arranged to communicate with a social network, notably arranged to receive, from the social network, an offer to share the access to the host network intended for the invited user, the users being connected via the social network;

a first sending/receiving submodule arranged to receive, from the invited terminal, a request to access the host network, and send configuration information to the invited terminal;

a second sending/receiving submodule arranged to receive, from a second network access management module associated with the host user, a request to identify the invited terminal, send, to the second module, information identifying the invited terminal, and receive configuration information comprising an access configuration allowing the invited terminal to access the host network, the invited terminal having previously been identified by the second management module via the identification information sent.

According to a fifth aspect, the subject of the disclosure relates to a system for configuring access to a host network, the system comprising:

a network access management module according to the third aspect;

a network access management module according to the fourth aspect;

a social network.

According to a sixth aspect, the disclosure also relates to a program for a network access management module, comprising program code instructions intended to control the execution of the steps of the method for configuring access to a host network described previously, when said program is run by said module and a storage medium that can be read by a module on which is stored a program for a module.

BRIEF DESCRIPTION OF THE DRAWINGS

The disclosure will be better understood using the following description of particular embodiments, with reference to the attached drawings in which.

DETAILED DESCRIPTION OF ILLUSTRATIVE EMBODIMENTS

Figure 1:
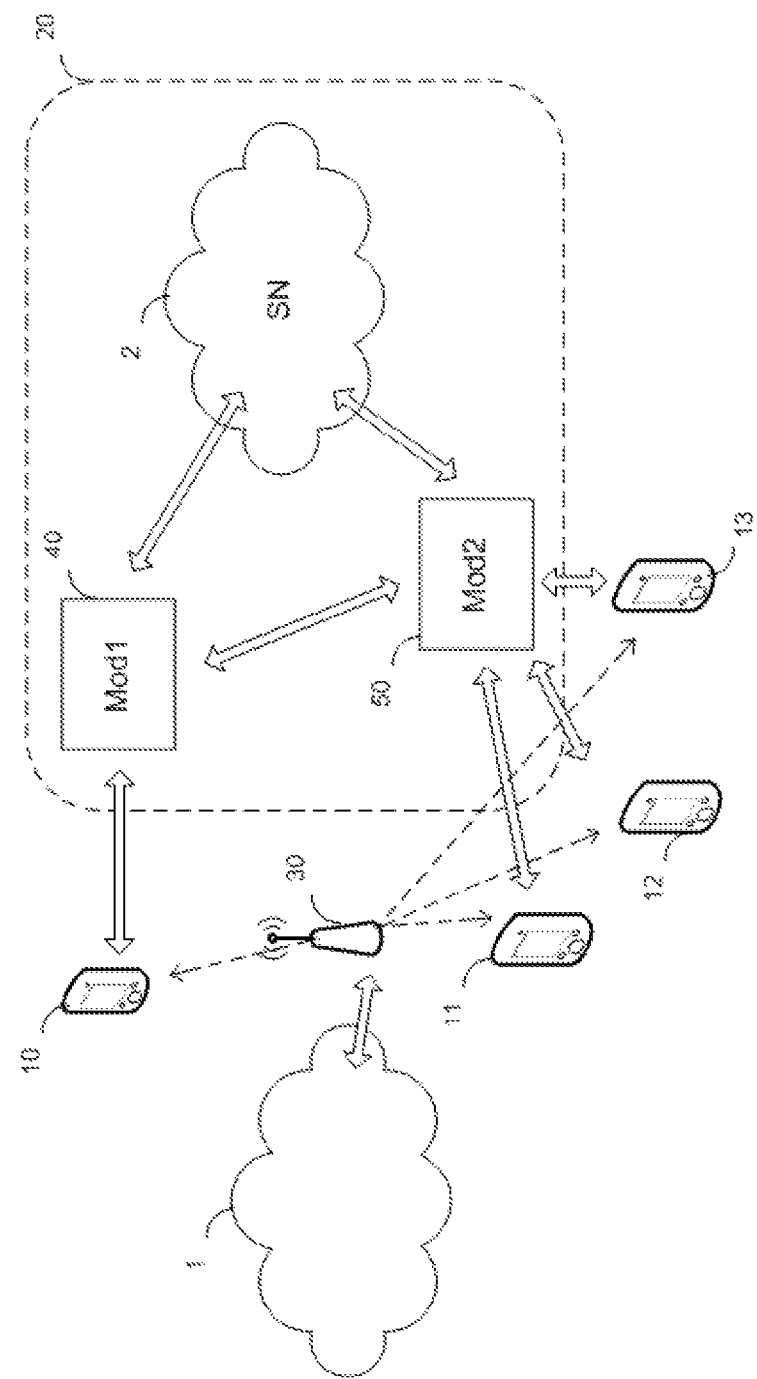
FIG. 1 represents a system for configuring access to a host network.

FIG. 1 represents a system 20 for configuring an access to a host network 1 for invited terminals 11-13. The network 1 is, for example, a telecommunication operator network. An access point 30 makes it possible to access the network 1.

The system 20 comprises a first network access management module 40 associated with a host user, a second network access management module 50 associated with an invited user and a social network 2. The social network is, for example, a network such as those known by the trade names Facebook®, Linkedin® or Viadeo®. The first and second network access management modules 40, 50 communicate with one another, and also communicate with the social network 2.

A terminal associated with the host user, the host terminal 10, communicates with the first network access management module 40. Just one host terminal 10 is represented, but there is no limitation on the number of host terminals that can be connected with the first network access management module 40.

Similarly, invited terminals 11-13 associated with the invited user communicate with the second network access management module 50. There is no limitation on the number of invited terminals 11-13 associated with the invited user.

The terminals 10-13 are, for example, a personal computer, a mobile terminal or even a tablet having a radio interface.

The first and second network access management modules 40, 50 are represented as separate from the terminals 10-13 and from the social network 2. In another embodiment, the first and second modules are respectively incorporated in a terminal 10 associated with the host user and in an invited terminal 11-13 associated with the invited user. In yet another embodiment, the modules 40, 50 are elements of the social network 2 respectively associated with a user account of the host user and a user account of the invited user.

In the embodiment represented, the host user uses his or her host terminal 10 to send an offer to share the access to the host network 1, via the first network access management module 40, to an invited user with which he or she is connected via the social network 2. The invited user is informed of the offer sent by the host user when he or she is authenticated with one of his or her invited terminals 11-13 on the social network 2, the latter relaying to him or her the offer to share the access via the second network access management module 50. The first and second network access management modules 40, 50 then exchange together in order to authorize an access to the host network 1 via the access point 30 to one or more of the invited terminals 11-13. These exchanges will be detailed below in relation to FIG. 2.

Figure 2:
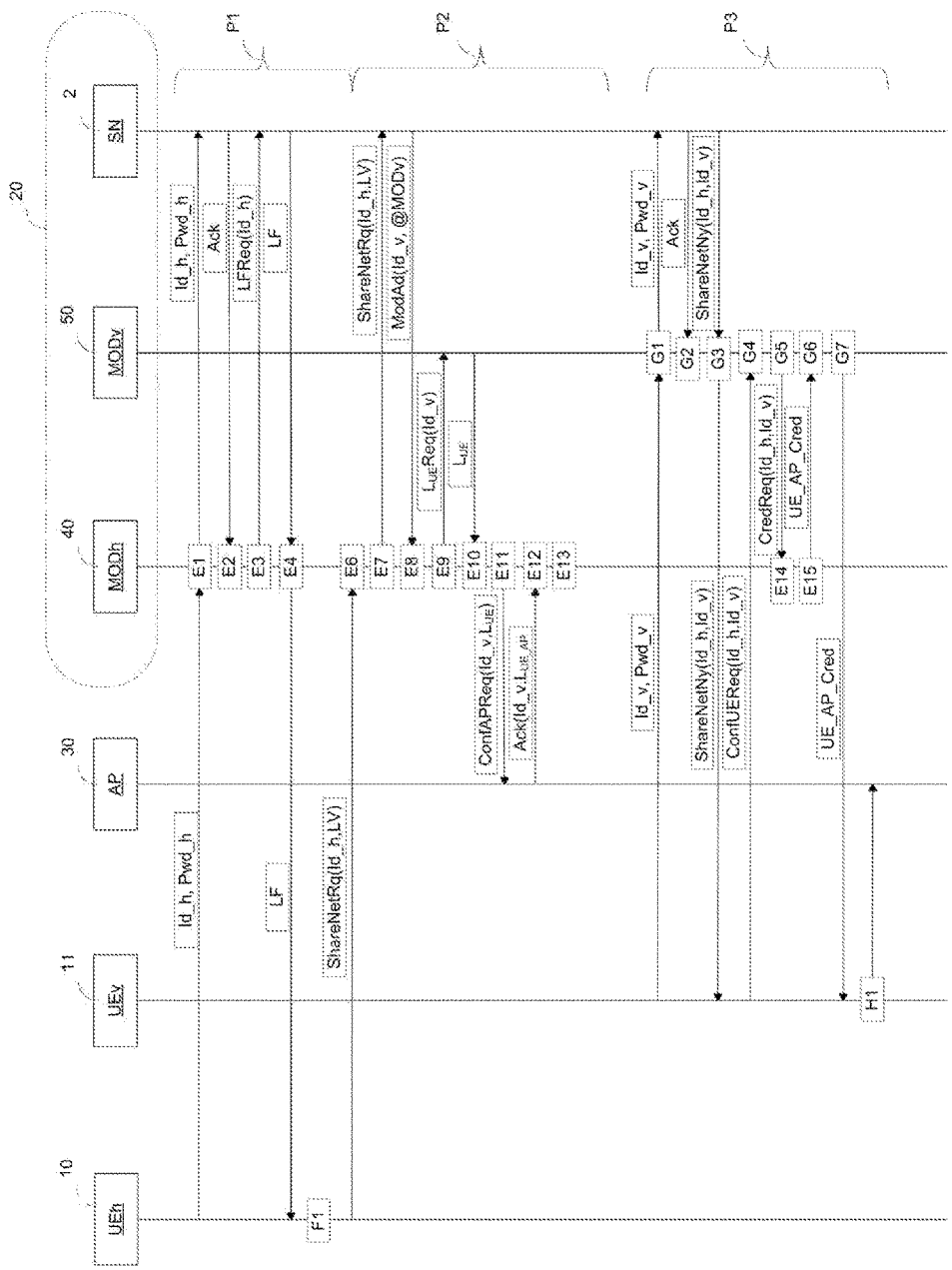
FIG. 2 represents steps of a method for configuring access to a host network in a particular embodiment.

Reference is now made to FIG. 2 which describes the steps of the method for configuring access to a host network 1 according to a particular embodiment.

In this embodiment, a host user wants to offer, from his or her terminal 10, to share the access to the host network 1 that he or she administers to an invited user having invited terminals 11-13. The configuration method comprises three phases P1, P2 and P3. The first phase P1 is a phase of obtaining, by the host user, of a list of invited users. It is followed by a phase P2 consisting in configuring an access point 30 to the host network 1 to authorize the attachment to this network of invited terminals 11-13 associated with the invited user. For its part, the phase P3 makes it possible to configure each invited terminal 11-13 of the invited user for it to be able to access the host network 1. The configuration method is implemented by a first network access management module 40 associated with the host user and by a second network access management module 50 associated with the invited user, each of these two modules dialoging with a social network 2. The host and invited users are each a member of the social network 2 and connected with one another via this network 2.

In a step E1, the first management module 40 receives an authentication message from the host terminal 10. This message comprises an identifier Id_h and a password Pwd_h associated with the host user. The first management module 40 memorizes the identifier Id_h, then relays the authentication message to the social network 2 in order to authenticate the host user. The authentication is, in this embodiment, delegated to the social network 2. The host user can therefore use the identifier and password that he or she usually used to be authenticated with the social network 2. In another embodiment, the host user is authenticated with the social network and then accesses the first network access management module from his or her user account.

During a step E2, the first management module 40 receives an acknowledgement from the social network 2 once the host user is authenticated.

In a step E3, the first management module 40 sends a request to the social network 2 in order to obtain a list LF of users connected with the host user (e.g. friends, colleagues) via the social network 2. More specifically, the list LF is a list of unique identifiers corresponding respectively to a user of the social network 2 connected with the host user of identifier Id_h. It should be noted that the list LF comprises all the users connected with the host user.

The first management module 40 receives the list LF in a step E4.

In a step E5, this list is sent to the host terminal 10 for the host user to be able to select, using his or her terminal 10 (step F1), the users with whom he or she wants to share his or her access to the host network. The selection of these users is done for example via the display of a selection window on the screen of the host terminal 10. No input of information relating to the invited users is required, the latter being supplied by the social network 2. A second list LV comprising only the users selected by the host user is thus obtained.

In the step E6, the first management module 40 receives, from the host terminal 10, a request to offer to share the access to the host network in association with an identifier of the host user and the list LV of users previously selected for the sharing offer. These users are hereinafter called "invited users". The step E6 with the obtaining of the list of invited users by the first management module 40, terminates the first phase P1. It also marks the start of the second phase P2 of configuration of the access point 30 to the host network 1.

During the step E7, the first management module 40 transmits, to the social network 2, the request to offer to share the access to the host network 1.

In a step E8, the first management module 40 receives, from the social network 2, an acknowledgement to the request to offer to share the access to the host network 1. Thus, for each invited user in the list LV, an address @MODv of a second management module 50 with which the invited user of identifier Id_v is associated is also obtained.

During a step E9, the first management module 40 prepares a request for information identifying the invited terminals 11-13 associated with the invited user of identifier Id_v, then sends it to the second management module 50 of address @MODv.

In response to this request, the first management module 40 receives, in a step E10, a list of identification information relating to the invited terminals 11-13 associated with the invited user. In the present embodiment, the identification information corresponds to an MAC address and to the name of the owner of the terminal. There is, however, no limitation as to the identification information; it can be an MAC address, an IMEI identifier, or any other identifier making it possible to uniquely identify the invited terminals.

During a step E11, the first management module 40 sends an access configuration request to the host network 1. More specifically, this request is sent to the access point 30 to the host network 1 with the list of invited terminals 11-13 associated with the invited user and the identifier of the invited user. This list enables the access point 30 to authorize an access to the host network 1 for each of the invited terminals 11-13 associated with the invited user, the latter being, for example, identified by their MAC addresses. Conversely, any terminal whose MAC address is unknown to the access point 30 is prohibited from accessing the host network 1. This access filtering step based on the identification information of the invited terminals 11-13 makes it possible to reinforce the controlled access to the host network 1.

Once the configuration of the access point 30 is finished, the first management module 40 receives, in a step E12, an acknowledgement from the access point 30 comprising configuration information, notably an access configuration making it possible for the invited terminals 11-13 to identify the host network 1. This access configuration comprises, for example, an identifier of the host user, an identifier of the invited user, a list of invited terminal identifiers, an identifier of the type of authentication chosen, an identifier of the host network 1, and a network access key.

The exchanges between the first management module 40 and the access point 30 can be conducted via the TR-069 protocol defined by the Broadband Forum. These exchanges can also be implemented via any other protocol that makes it possible to remotely administer peripheral devices.

In a step E13, the first management module 40 updates a database in which it memorizes the access configuration. This step closes the second phase P2 of configuration of the access point 30 to the host network 1. The first management module 40 is then ready to supply configuration information allowing the invited terminals 11-13 requesting it to access the host network 1.

The phase P3 is carried out for each invited terminal 11-13. In order to avoid overloading FIG. 4, the steps of configuring access to the host network 1 have, however, been represented for a single invited terminal 11. The phase P3 of configuration of the invited terminal 11 begins with a step of authentication of the terminal with the social network 2 via the second management module 50. For this, during a step G1, the second management module 50 receives an authentication message comprising a unique identifier of the invited user and a password allowing access to the social network 2. The second management module 50 then relays the authentication message to the social network 2.

In a step G2, the second management module 50 receives an acknowledgement from the social network 2. The invited user is then authenticated with the social network 2.

During a step G3, the second management module 50 is notified by the social network 2 of the offer to share the access to the host network 1 sent previously by the host user using his or her host terminal 10 during the phase P1. It is thus sufficient for an invited user to be authenticated on the social network 2 to be offered an offer to share the access for which he or she is the recipient. This notification is sent to the invited terminal 11.

In a step G4, the second management module 50 receives, from the invited terminal 11, a request to access the host network 1. The invited user can then choose to proceed or not with the offer to share the access that he or she has been notified of in order to configure his or her invited terminal 11 to access the host network 1. The configuring of the access to the host network 1 is therefore unintrusive and enables the invited user to decide, on his or her own initiative, to update the configuration of his or her invited terminal 11.

After having received the request to access the host network 1, the second management module 50 interrogates, in a step G5, the first management module 40 in order to obtain the identifier of the host network 1 and the network access key allowing access to the host network 1. This interrogation is accompanied in particular by an identifier of the host user, an identifier of the invited user and an identifier of the invited terminal 11.

In a step E14, the first management module 40 receives the request for identifier and network access key associated with the host network 1. The first management module 40 interrogates its database with the identifier of the host user, the identifier of the invited user and the identifier of the invited terminal 11 received in the preceding step. If an entry in its database exists for these identifiers, the first management module 40 returns the network access key allowing access to the host network 1 in a step E15.

The second management module 50 receives the authentication parameters (identifier of the network and network access key) from the host network 1 during a step G6. It can then send all the configuration information necessary for the invited terminal 11 to access the host network 1 during a step G7 which terminates the third phase P3 of the method. The invited terminal 11 can thus be authenticated with the access point 30 to the host network 1 (step H1).

The method for configuring access to the host network 1 has been described for a single invited user and a single invited terminal 11. There is however no limitation as to the number of invited users or of invited terminals 11-13. The steps E8 to E13 are notably repeated for each invited user in the list of invited users obtained in the phase P1. Similarly, the steps G1 to G7 are reiterated for each invited terminal 11-13 with which an invited user wants to access the host network 1.

In a particular embodiment, the invited users have the possibility of accepting or rejecting the offer to share the access to the host network 1 sent by the first management module 40 in the step E7. The step E8 is then adapted in order to interrogate each invited user once the request to offer to share the access to the host network 1 is acknowledged. After sending the acknowledgement message, the social network 2 transmits, to each second management module 50 associated with an invited user, a notification indicating the desire of the host user to offer to share the access to the host network 1. Each second management module 50 relays the notification to the terminals associated with each of the invited users. Each invited user can then accept or reject the proposed offer from one of his or her invited terminals 11-13 which are associated with him or her via his or her second access management module 50.

This offer is communicated, for example, to each invited user by the display of a message on the screen of the invited terminals 11-13. In the case of rejection, the invited terminal 11 sends a message rejecting the offer to share the access to the host network 1 to the second access management module 50. The latter relays the rejection message to the social network 2 which in turn sends a request to the first management module 40 in order to interrupt the current access configuration method for the invited user associated with the second management module 50. According to another variant, the second management module 50 relays the notification indicating the desire of the host user to offer to share the access to the host network 1, not to the terminals associated with each of the invited users, but to a terminal declared as "main terminal" in the second access management module 50 associated with each invited user.

In another embodiment, during the step E10, the second management module 50 returns to the first management module 40 only the invited terminals selected by the invited user. Following the step E9 of sending of a request for information identifying the invited terminals 11-13 associated with the invited user, the second management module 50 interrogates, for example, each invited terminal 11-13 associated with the invited user in order for the latter to give his or her agreement to the supply of the identification information relating to the interrogated invited terminal. A response message indicating whether the interrogated invited terminal authorizes access to its identification information is sent to the second management module 50. The latter constructs a list of identification information relating to only the invited terminals 11-13 selected by the invited user, and sends it to the second management module 50 of the host user.

In another embodiment, prior to the step E11, the method for configuring access to the host network 1 comprises a step of generating unique authentication parameters for each invited terminal 11-13. In particular, the authentication parameters are specific to each invited terminal 11-13. They are, for example, generated from information identifying the invited terminals 11-13 available to the second management module 40. The latter creates, for example, an SSID identifier and an access key to the host network 1 that are distinct for each invited terminal 11-13, from a unique identifier of each invited terminal 11-13, such as an MAC address and from a random number generating function. These identifier and access key pairs associated respectively with each invited terminal 11-13 are then sent to the access point 30 with the request to configure access to the host network 1. Since the sensitive information concerning access to the host network 1 is not shared between invited terminals, the security of the host network 1 is reinforced. According to a variant, an access to the host network 1 specific to each invited user can also be defined.

In another embodiment, following the step E13 of updating of its database, the first management module 40 sends, to the second management module 50, the memorized access configuration. The second management module 50 associated with the invited user thus has available all the configuration information allowing access to the host network 1 for the invited terminal 11. The steps G5 and E14, respectively of sending, by the second management module 50, and of reception, by the first management module 40, of a request in order to obtain the identifier and the access key to the host network 1, are then pointless. The same applies for the steps E15 and G6 respectively of sending, by the first management module 40, and of reception, by the second management module 50, of the identifier and of the access key to the host network 1.

In a particular embodiment, when the configuration of the access point 30 is finished, that is to say once the configuration information is obtained in the step E12 then memorized by the first management module 40 in the step E13, the host user can update the configuration information allowing access to the host network 1. The method, when it is implemented by the first management module 40, then comprises a step of updating of this information. This update consists, for example, in deleting the sharing of the access to the host network 1 for one or more invited users, or even for a particular type of invited terminal 11-13. It may also be a modification of the sharing of the access to the host network 1 for one or more invited users, or a particular type of invited terminal 11-13. The host user may notably want to change the level of security applicable for an invited user or an invited terminal. More specifically, the updating step is implemented via a substep of reception, from the host terminal 10, of a request to update the configuration for accessing the host network 1.

In another embodiment, the request to update the access configuration can also be received from the second management module 50. The invited user obtains, for example via an invited terminal, the list of his or her invited terminals from the second management module 50. Then, the invited user selects the invited terminals for which he or she wants to delete the access to the host network 1. A request to update the configuration for accessing the host network 1 for the selected terminals is then sent to the second management module 50, which relays the request to the first management module 40. An invited user who is the victim of a theft for an invited terminal can thus easily request the deletion of the access configuration relating to that terminal.

It should moreover be noted that the deletion of an access to the host network 1 for an invited terminal amounts to prohibiting the access to the host network 1 for that terminal.

In the case of an unsecured host network, the method can also be easily adapted to prohibit access to the host network for certain terminals. The list of invited users obtained in the phase P1 is then a list of users for whom access to the host network is to be prohibited. The phase P2 consists in configuring the access point 30 to the host network 1 to prohibit the attachment to this network of terminals associated with the users prohibited access. For its part, the phase P3 is not implemented.

There is no limitation as to the exchange technologies used. The aspects of the disclosure can notably be implemented over the HTTPS (Hypertext Transfer Protocol Secure) protocols or any other series of protocols incorporating an encryption layer. The sensitive data, such as the identifiers and network access keys are systematically encrypted when they are exchanged between modules, devices or entities of the network (e.g. terminal, access point, social network). The keys are, for example, sent via an XACML (eXtensible Access Control Markup Language) cookie. It is also possible for the first and second management modules 40, 50, to use encryption/decryption keys obtained from the social network 2 in order to guarantee the confidentiality and the integrity of the sensitive data exchanged.

Figure 3:
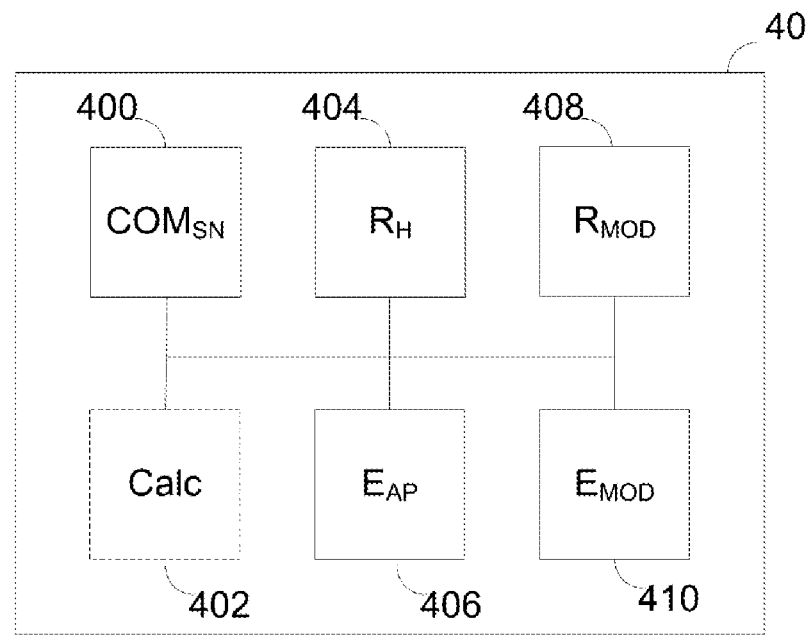
FIG. 3 represents a network access management module associated with a host user implementing a method for configuring access to a host network according to a particular embodiment.

FIG. 3 represents a first management module 40 for accessing a host network 1 arranged, when it is associated with a host user, to authorize an access to this host network 1 for at least one invited terminal associated with an invited user.

This first module 40 notably comprises:
a first communication submodule 400 arranged to communicate with a social network 2, the host and invited users being connected via said social network 2;
a first reception submodule 404 arranged to receive, from a host terminal 10 associated with a host user, an offer to share the access to the host network 1 intended for the invited user;
a first sending submodule 410 arranged to send, to a second network access management module 50 associated with the invited user, a request for information identifying the invited terminal 11, and to send, to the second module 50, configuration information intended for the identified invited terminal 11, said configuration information allowing the access to the host network 1;

a second reception submodule 408 arranged to receive, from the second network access management module 50, information identifying the invited terminal 11;

a second sending submodule 406 arranged to send, to the host network 1, an access configuration request, this configuration, once done, making it possible to authorize an access to the host network 1 for the identified invited terminal 11;

a computation submodule 402 arranged to generate authentication parameters associated with the invited terminal 11.

In another embodiment, the first management module 40 does not comprise any computation submodule 402. Such is in particular the case in an embodiment without the generation of authentication parameters associated with an invited terminal.

Figure 4:
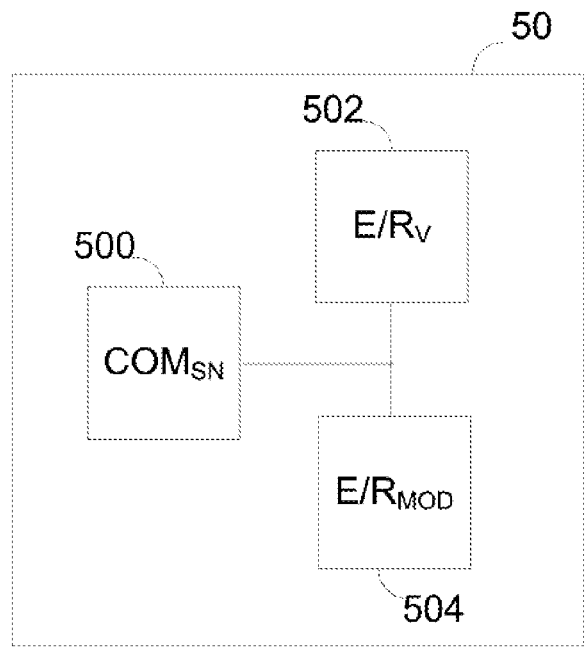
FIG. 4 represents a network access management module associated with an invited user implementing a method for configuring access to a host network according to a particular embodiment.

FIG. 4 represents a second network access management module 50 arranged, when it is associated with an invited user, to authorize an access to a host network 1 for at least one invited terminal 11-13 associated with this invited user.

This second module 50 notably comprises:

a first communication submodule 500 arranged to communicate with a social network 2, and notably arranged to receive, from the social network 2, an offer to share the access to the host network 1 intended for the invited user, the host and invited users being connected via the social network 2;

a first sending/receiving submodule 502, arranged to receive, from the invited terminal, a request for access to the host network 1, and send configuration information to this invited terminal 11;

a second sending/receiving submodule 504 arranged to receive, from a second network access management module 40 associated with the host user, a request to identify the invited terminal 11, send, to this second module 40, information identifying said invited terminal 11, and receive configuration information comprising an access configuration allowing the invited terminal 11 to access the host network 1, the terminal having previously been identified by the second management module 40 via the identification information sent.

The network access management modules 40, 50, described in relation to FIGS. 2 and 3, are, for example, a software application, typically an application of the social network 2, called "Facebook® application" installed on the terminal of the host user and on the invited terminals 11-13. It can also be a software application installed on a network gateway or any other device allowing access to a host network 1 and interfaced with a social network 2.

The various aspects of the disclosure can be implemented by using software and/or hardware components. In this respect, the terms "module" and "submodule" can, in this document, correspond equally to a software component and to a hardware component or to a set of hardware and/or software components, suitable for implementing a function or a set of functions, according to what is described previously for the module or submodule concerned.

A software component corresponds to one or more computer programs, one or more subroutines of a program, or, more generally, to any element of a program or of a software package. Such a software component is stored in memory then loaded and run by a data processor of a physical entity and is likely to access the hardware resources of this physical entity (memories, storage media, communication bus, electronic input/output boards, user interfaces, etc.).

Similarly, a hardware component corresponds to any element of a hardware set. It can be a programmable or non-programmable hardware component, with or without integrated processor for running software. It is, for example, an integrated circuit, a chip card, an electronic board for executing firmware, etc.

In a particular embodiment, the submodules 400, 402, 404, 406, 408, 410, 500, 502 and 504 are arranged to implement the method for configuring access to a host network described previously. They are preferably software submodules comprising software instructions for having the steps of the method for configuring access to a host network described previously executed, implemented by a network access management module. An aspect of the present disclosure therefore also relates to:

a program for a module, comprising program code instructions intended to control the execution of the steps of the method for configuring access to a host network described previously, when said program is run by said module;

a storage medium that can be read by a module on which is stored the program for a module.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

Although the present disclosure has been described with reference to one or more examples, workers skilled in the art will recognize that changes may be made in form and detail without departing from the scope of the disclosure and/or the appended claims.

The invention claimed is:

1. A method for configuring access to a network, called host network, to allow at least one terminal associated with an invited user, called invited terminal, to access said host network, said method being implemented by a first network access management module associated with a host user, and comprising the following steps:

obtaining, via a social network, of a list of trusted users;

reception from a terminal associated with the host user, of an offer to share the access to the host network intended for the invited user, said invited user being selected from the list by the host user;

obtaining from a second network access management module associated with said invited user, information identifying said invited terminal;

obtaining from the host network configuration information allowing access to the host network by the invited terminal, following a sending, to the host network, of an access configuration request comprising said identification information and specific authentication parameters generated for said invited terminal; and sending, to the second management module, said configuration information, comprising the authentication parameters, including a service set identifier and an access key, specific to the invited terminal, offering the invited terminal a personalized access to the host network, intended to be transmitted to the invited terminal.

2. The method according to claim 1, further comprising, prior to the step of obtaining identification information, a step of obtaining, via the social network an address of the second management module, said address being used in the obtaining of the identification information from the second management module.

3. The method according to claim 1, the method further comprising, prior to the step of sending to the host network, a step of generation of said authentication parameters by the first network access management module.

4. The method according to claim 1, further comprising, prior to the reception step, a step of obtaining, via the social network, of a list of invited users, the steps of the method being reiterated for each invited user in said list.

5. The method according to claim 1, further comprising a step of updating of said configuration information allowing access to the host network by the invited terminal.

6. A method for configuring access to a network, called host network, to allow a terminal associated with an invited user, called invited terminal, to access said host network, said method being implemented by a first network access management module associated with an invited user, and comprising the following steps:
   sending a request to a social network of a list of trusted users
   supplying information identifying the invited terminal to a second network access management module associated with the host network, in response to a request for information identifying the invited terminal received from said second module;
   reception, from a terminal associated with the host user, via a social network, of an offer to share the access to the host network intended for the invited user, said invited user being selected by host user from the list;
   reception of a request to access the host network from the invited terminal; and
   sending to the invited terminal, configuration information comprising authentication parameters, including a service set identifier and an access key, specific to the invited terminal, obtained from the second management module, said configuration information comprising an access configuration offering the invited terminal a personalized access to the host network, obtained by the second management module by using the information identifying the invited terminal and the authentication parameters specific to said invited terminal.

7. The method according to claim 6, in which the supply of the identification information is performed after the reception of a message selecting the invited terminal by the invited user.

8. The method according to claim 6, further comprising, prior to the step of reception of the access request, a step of obtaining, from the invited terminal, an agreement from the invited user to the offer to share the access received from the host user.

9. A network access management module arranged to authorize an access to a host network to at least one invited terminal associated with an invited user, said module being associated with a host user and comprising:
   a hardware memory;
   at least one communication bus;
   a first communication submodule configured to communicate with a social network, and to obtain a list of trusted users to which a host user is connected via said social network;
   a first reception submodule configured to receive, from a terminal associated with a host user, an offer to share the access to the host network intended for the invited user, said invited user being selected from the list by the host user;
   a first sending submodule configured to send, to a second network access management module associated with said invited user, a request for information identifying said at least one invited terminal, and to send, to said second management module, configuration information comprising authentication parameters, including a service set identifier and an access key, specific to the invited terminal, intended for the identified invited terminal, said configuration information offering a personalized access to the host network;
   a second reception submodule arranged to receive, from a second network access management module associated with said invited user, information identifying said at least one invited terminal; and
   a second sending submodule arranged to send, to the host network, an access configuration request comprising said identification information and the authentication parameters specific to said invited terminal, said configuration, once done, making it possible to authorize said identified invited terminal to access the host network.

10. A network access management module arranged to authorize at least one invited terminal associated with an invited user to access a host network, said module being associated with an invited user, comprising:
   a hardware memory;
   at least one communication bus;
   a first communication submodule arranged to communicate with a social network, notably arranged to receive, from the social network, an offer to share the access to the host network intended for the invited user, said invited user being selected from a list of trusted users connected to the host user via the social network;
   a first sending/receiving submodule arranged to receive, from the invited terminal, a request to access the host network, and send configuration information to said invited terminal;
   a second sending/receiving submodule arranged to receive, from a second network access management module associated with the host user, a request to identify the invited terminal, send, to said second module, information identifying said invited terminal, and receive configuration information, comprising authentication parameters, including a service set identifier and an access key, specific to the invited terminal and an access configuration offering the invited terminal a personalized access to the host network, the invited terminal having previously been identified by the second management module via the sent identification information and the authentication parameters specific to said invited terminal to access the host network.

11. A non-transitory computer-readable storage medium comprising instructions stored thereon, which when executed by a processor of a first network access management module associated with a host user, configure the first network access module to perform a method of configuring access to a host network to allow at least one terminal associated with an invited user, called invited terminal, to access said host network, said method comprising the following steps:
   obtaining, via a social network, of a list of trusted users;
   reception from a terminal associated with the host user, of an offer to share the access to the host network intended for the invited user, said invited user being selected from the list by the host user;
   obtaining from a second network access management module associated with said invited user, of information identifying said invited terminal;

obtaining from the host network of configuration information comprising authentication parameters, including a service set identifier and an access key, specific to the invited terminal, allowing access to the host network by the invited terminal, following a sending, to the host network, of an access configuration request comprising said identification information and the authentication parameters specific to said invited terminal; and sending, to the second management module, said configuration information to offer the invited terminal a personalized access to the host network, intended to be transmitted to the invited terminal.

12. A non-transitory computer-readable storage medium comprising instructions stored thereon, which when executed by a processor of a first network access management module associated with an invited user configure the first network access management module to perform a method of configuring access to a host network to allow a terminal associated with the invited user, called an invited terminal, to access said host network, said method comprising the following steps:

sending a request to a social network for a list of trusted users supplying information identifying the invited terminal to a second network access management module associated with the host network, in response to a request for information identifying the invited terminal received from said second module;

receiving, from a terminal associated with the host user, via a social network, an offer to share the access to the host network intended for the invited user, said invited user being selected by host user from the list;

receiving a request to access the host network from the invited terminal; and sending to the invited terminal, configuration information comprising authentication parameters, including a service set identifier and an access key, specific to the invited terminal, obtained from the second management module, said configuration information comprising an access configuration offering the invited terminal a personalized access to the host network, obtained by the second management module by using the information identifying the invited terminal and the authentication parameters specific to the invited terminal to access the host network.

* * * * *